US012645469B2

(12) United States Patent
Kommoju

(10) Patent No.: US 12,645,469 B2
(45) Date of Patent: Jun. 2, 2026

(54) METHODS AND SYSTEMS FOR CONFIGURATION AND ENROLLMENT OF IMAGE CAPTURING DEVICES USING ARTIFICAL INTELLIGENCE (AI)

(71) Applicant: Honeywell International Inc., Charlotte, NC (US)

(72) Inventor: Raja Kommoju, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 56 days.

(21) Appl. No.: 18/764,214

(22) Filed: Jul. 4, 2024

(65) Prior Publication Data
US 2026/0010381 A1 Jan. 8, 2026

(51) Int. Cl.
*G06F 9/445* (2018.01)
*H04N 23/62* (2023.01)

(52) U.S. Cl.
CPC ......... *G06F 9/44505* (2013.01); *H04N 23/62* (2023.01)

(58) Field of Classification Search
CPC .............................. G06F 9/44505; H04N 23/62
See application file for complete search history.

(56) References Cited

U.S. PATENT DOCUMENTS

| | | | | |
|---|---|---|---|---|
| 10,453,216 | B1 * | 10/2019 | Zelenskiy | G06V 20/62 |
| 10,708,265 | B2 * | 7/2020 | Raje | H04N 21/6547 |
| 12,047,712 | B2 * | 7/2024 | Iwai | G08B 13/19602 |
| 2005/0152287 | A1 * | 7/2005 | Yokomitsu | H04L 61/45 |
| | | | | 370/255 |
| 2014/0300637 | A1 * | 10/2014 | Fan | G06T 7/75 |
| | | | | 382/100 |
| 2017/0164016 | A1 * | 6/2017 | Yang | H04L 47/70 |
| 2018/0278573 | A1 * | 9/2018 | Lu | H04L 67/02 |
| 2019/0132371 | A1 * | 5/2019 | Bhat | G06F 3/04842 |
| 2020/0193787 | A1 * | 6/2020 | Jolivet | G08B 13/19656 |
| 2021/0136270 | A1 * | 5/2021 | Kunjukkannan | H04N 23/617 |
| 2021/0289131 | A1 * | 9/2021 | Yadav | G06N 20/00 |

(Continued)

OTHER PUBLICATIONS

Eldrandaly et al., PTZ-Surveillance coverage based on artificial intelligence for smart cities, International Journal of Information Management, 49 (2019), pp. 520-532. https://www.sciencedirect. com/science/article/pii/S0268401218310089.

(Continued)

*Primary Examiner* — Faisal M Zaman

(57) ABSTRACT

A method and system for configuring and enrolling one or more image capturing devices are disclosed. The method comprises receiving, via at least one processor, at least one input request from a user; determining, via the at least one processor, a position and a placement of the image capturing devices based at least on multimedia data captured by the image capturing devices and at least one input request, using a video cognitive module; generating, via the at least one processor, a configuration data sheet for the one or more image capturing devices based at least on one or more data sets and the position and the placement of the one or more image capturing devices, using an AI module; initiating the configuration and the enrollment of the one or more image capturing devices based at least on the generated configuration data sheet using a camera module.

20 Claims, 8 Drawing Sheets

(56) References Cited

U.S. PATENT DOCUMENTS

| 2022/0101014 | A1* | 3/2022 | Kojima | ..................... G06F 8/20 |
| 2022/0303179 | A1* | 9/2022 | Rodriguez Bravo | .. G16Y 30/00 |
| 2025/0139830 | A1* | 5/2025 | Takahashi | ................. G06T 7/73 |

OTHER PUBLICATIONS

Modeling Multi-Camera Coverage for Placement Optimization, IEEE Sensor Letters, vol. 2(3), Oct. 2017, 4 pages. https://www.researchgate.net/publication/320177693_Modeling_Multi-Camera_Coverage_for_Placement_Optimization.

MarketsandMarkets Research Pvt. Ltd., AI in Video Surveillance Companies—Hangzhou Hikvision Digital Technology Co., Ltd. (China) and Dahua Technology Co., Ltd. (China) are the Key Players, Sep. 12, 2023, 6 pages. https://www.globenewswire.com/news-release/2023/09/12/2741542/0/en/AI-in-Video-Surveillance-Companies-Hangzhou-Hikvision-Digital-Technology-Co-Ltd-China-and-Dahua-Technology-Co-Ltd-China-are-the-Key-Players.html.

VXG, Open AI VSaaS VMS company Video Experts Group offers integration of cameras to any AI engine, Jun. 10, 2020, 5 pages. https://www.sourcesecurity.com/news/open-ai-vsaas-vms-company-video-co-14381-ga.1591804752.html.

* cited by examiner

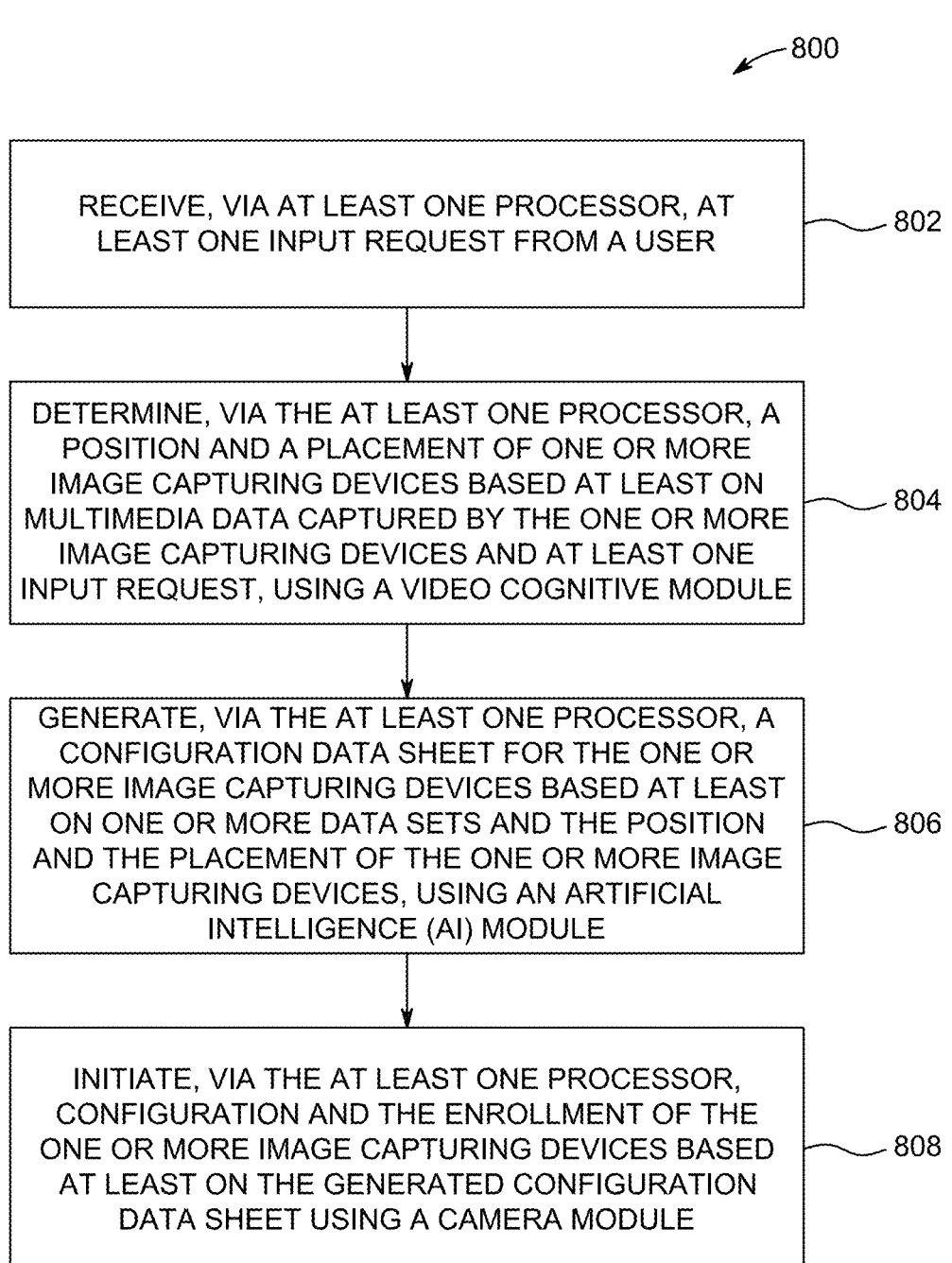

RECEIVE, VIA AT LEAST ONE PROCESSOR, AT LEAST ONE INPUT REQUEST FROM A USER ⎯ 802

DETERMINE, VIA THE AT LEAST ONE PROCESSOR, A POSITION AND A PLACEMENT OF ONE OR MORE IMAGE CAPTURING DEVICES BASED AT LEAST ON MULTIMEDIA DATA CAPTURED BY THE ONE OR MORE IMAGE CAPTURING DEVICES AND AT LEAST ONE INPUT REQUEST, USING A VIDEO COGNITIVE MODULE ⎯ 804

GENERATE, VIA THE AT LEAST ONE PROCESSOR, A CONFIGURATION DATA SHEET FOR THE ONE OR MORE IMAGE CAPTURING DEVICES BASED AT LEAST ON ONE OR MORE DATA SETS AND THE POSITION AND THE PLACEMENT OF THE ONE OR MORE IMAGE CAPTURING DEVICES, USING AN ARTIFICIAL INTELLIGENCE (AI) MODULE ⎯ 806

INITIATE, VIA THE AT LEAST ONE PROCESSOR, CONFIGURATION AND THE ENROLLMENT OF THE ONE OR MORE IMAGE CAPTURING DEVICES BASED AT LEAST ON THE GENERATED CONFIGURATION DATA SHEET USING A CAMERA MODULE ⎯ 808

FIG. 8

METHODS AND SYSTEMS FOR CONFIGURATION AND ENROLLMENT OF IMAGE CAPTURING DEVICES USING ARTIFICAL INTELLIGENCE (AI)

TECHNOLOGICAL FIELD

The present invention relates to surveillance technology, and more particularly relates to methods and systems for configuration and enrollment of image capturing devices using artificial intelligence (AI).

BACKGROUND

In contemporary surveillance systems, integration of closed-circuit television (CCTV) cameras with video management systems (VMS) forms a backbone of effective security infrastructure across various sectors, including commercial, industrial, and governmental facilities. However, manual process of configuring and enrolling cameras within the system presents a significant challenge, both in terms of efficiency and accuracy. Administrators tasked with setting up the cameras face a laborious process. Such process of setting up the cameras involves navigating through complex configuration pages or specialized tools within the VMS to add each camera individually. The configuration pages potentially comprises dozens or even hundreds or thousands of cameras. The time and effort required for manual enrollment of these cameras can quickly become prohibitive, leading to delays in system deployment and increased operational costs.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a method is disclosed. The method comprises receiving, via at least one processor, at least one input request from a user. The at least one input request corresponds to configuration and enrollment of one or more image capturing devices, and the at least one input request comprises at least one of an internet protocol (IP) address or a range of IP addresses associated with the one or more image capturing devices to be configured and enrolled. The method further comprises determining, via the at least one processor, a position and a placement of the one or more image capturing devices based at least on multimedia data captured by the one or more image capturing devices and at least one input request, using a video cognitive module. Further, the method comprises generating, via the at least one processor, a configuration data sheet for the one or more image capturing devices based at least on one or more data sets and the position and the placement of the one or more image capturing devices, using an artificial intelligence (AI) module. Thereafter, the method comprises initiating, via the at least one processor, the configuration and the enrollment of the one or more image capturing devices based at least on the generated configuration data sheet using a camera module.

In some embodiments, the method further comprising converting, via the at least one processor, the one or more input requests into one or more commands using an artificial intelligence (AI)/machine learning (ML) technique.

In some embodiments, the method comprises tokenizing, via the at least one processor, the one or more commands using the AI module into a word tokenization, a character tokenization, and a sub-word tokenization.

In some embodiments, the multimedia data comprises at least one of one or more snapshots and video footages captured by the one or more image capturing devices.

In some embodiments, the position and the placement of the one or more image capturing devices corresponds to a parking lot, a lift lobby area, a reception, and a workplace.

In some embodiments, the configuration data sheet for the one or more image capturing devices comprises configuration settings of the one or more image capturing devices. In some embodiments, the configuration settings comprise at least one of one or more resolution setting, one or more framerate settings, and group of picture (GOP) settings.

In some embodiments, the one or more datasets comprises at least one of a product user guide, product database schemas, product database configuration scripts, or camera configuration templates.

In some embodiments, the method further comprises displaying, via the at least one processor, the configuration data sheet to the user on a user device for validation and confirmation on the configuration and enrollment of the one or more image capturing devices.

In another example embodiment, a system for configuring and enrolling one or more image capturing devices is disclosed. The system comprises a memory and at least one processor communicatively coupled to the memory. The at least one processor is configured to receive at least one input request from a user. The at least one input request corresponds to configuration and enrollment of the one or more image capturing devices, and the at least one input request comprises at least one of an internet protocol (IP) address or a range of IP addresses associated with the one or more image capturing devices to be configured and enrolled. Further, the at least one processor is configured to determine a position and a placement of the one or more image capturing devices based at least on multimedia data captured by the one or more image capturing devices and at least one input request, using a video cognitive module. Further, the at least one processor is configured to generate a configuration data sheet for the one or more image capturing devices based at least on one or more data sets and the position and the placement of the one or more image capturing devices, using an artificial intelligence (AI) module. Thereafter, the at least one processor is configured to initiate the configuration and the enrollment of the one or more image capturing devices based at least on the generated configuration data sheet using a camera module.

In another example embodiment, a non-transitory machine-readable information storage medium is disclosed. The non-transitory machine-readable information storage medium comprises one or more instructions which when executed by at least one processor causes configuring and enrolling one or more image capturing devices by receiving at least one input request from a user. The at least one input request corresponds to configuration and enrollment of one or more image capturing devices, and the at least one input request comprises at least one of an internet protocol (IP) address or a range of IP addresses associated with the one or more image capturing devices to be configured and enrolled. Further, determining a position and a placement of the one or more image capturing devices based at least on multimedia data captured by the one or more image capturing devices and at least one input request, using a video cognitive module; generating a configuration data sheet for the one or more image capturing devices based at least on one or more data sets and the position and the placement of the one or more image capturing devices, using an artificial intelligence (AI) module; and initiating the configuration and the enrollment of the one or more image capturing devices based at least on the generated configuration data sheet using a camera module.

The above summary is provided merely for purposes of summarizing some exemplary embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

Figure 1:
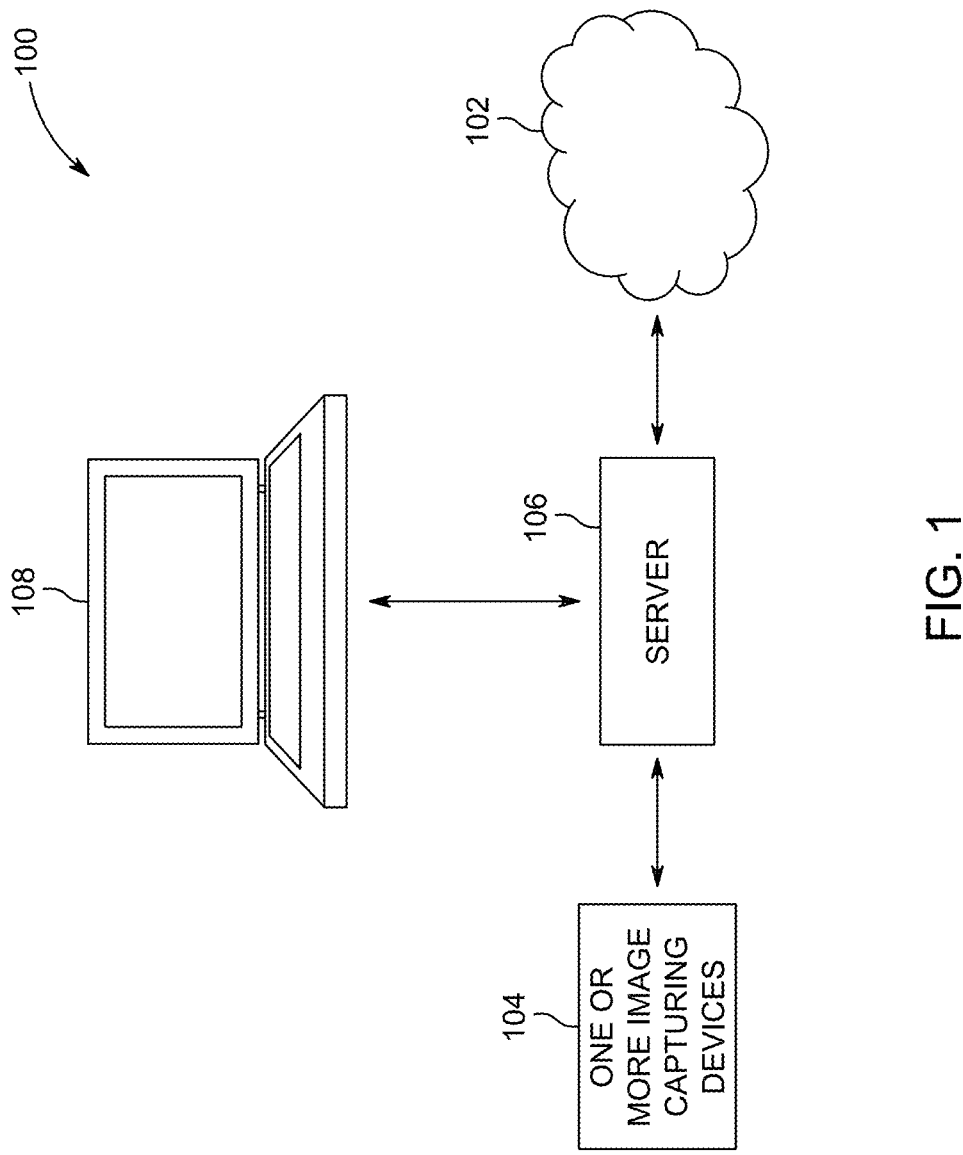
Figure 2:
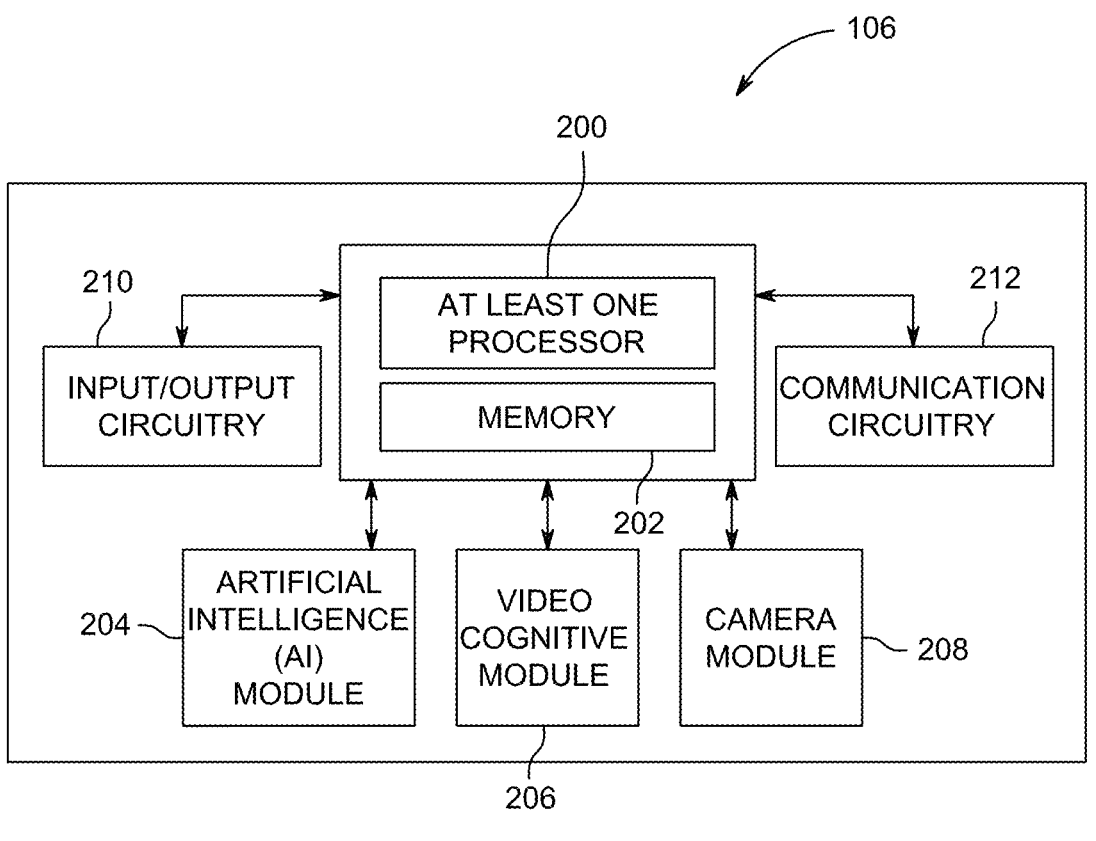
Figure 3:
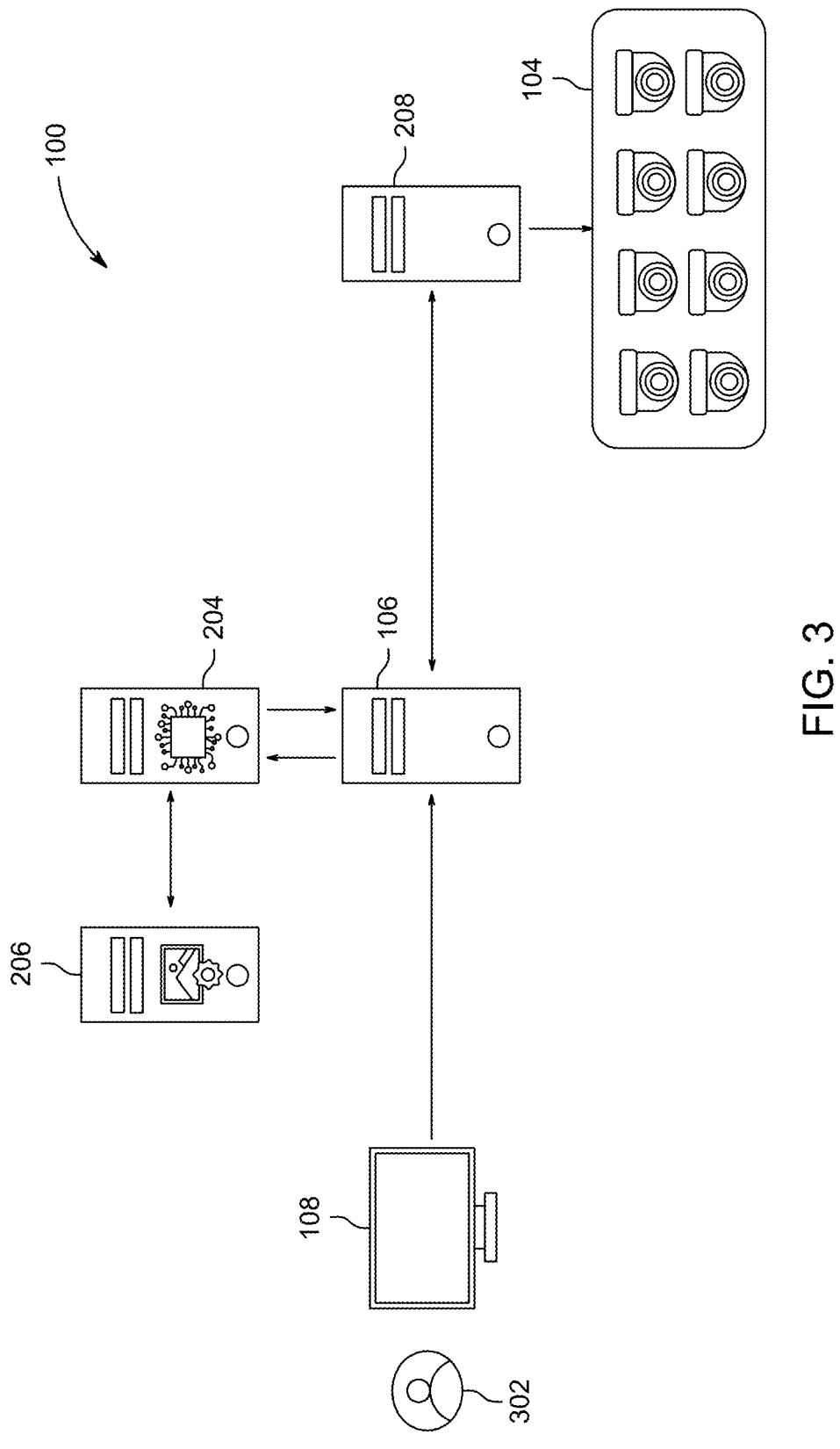
Figure 4:
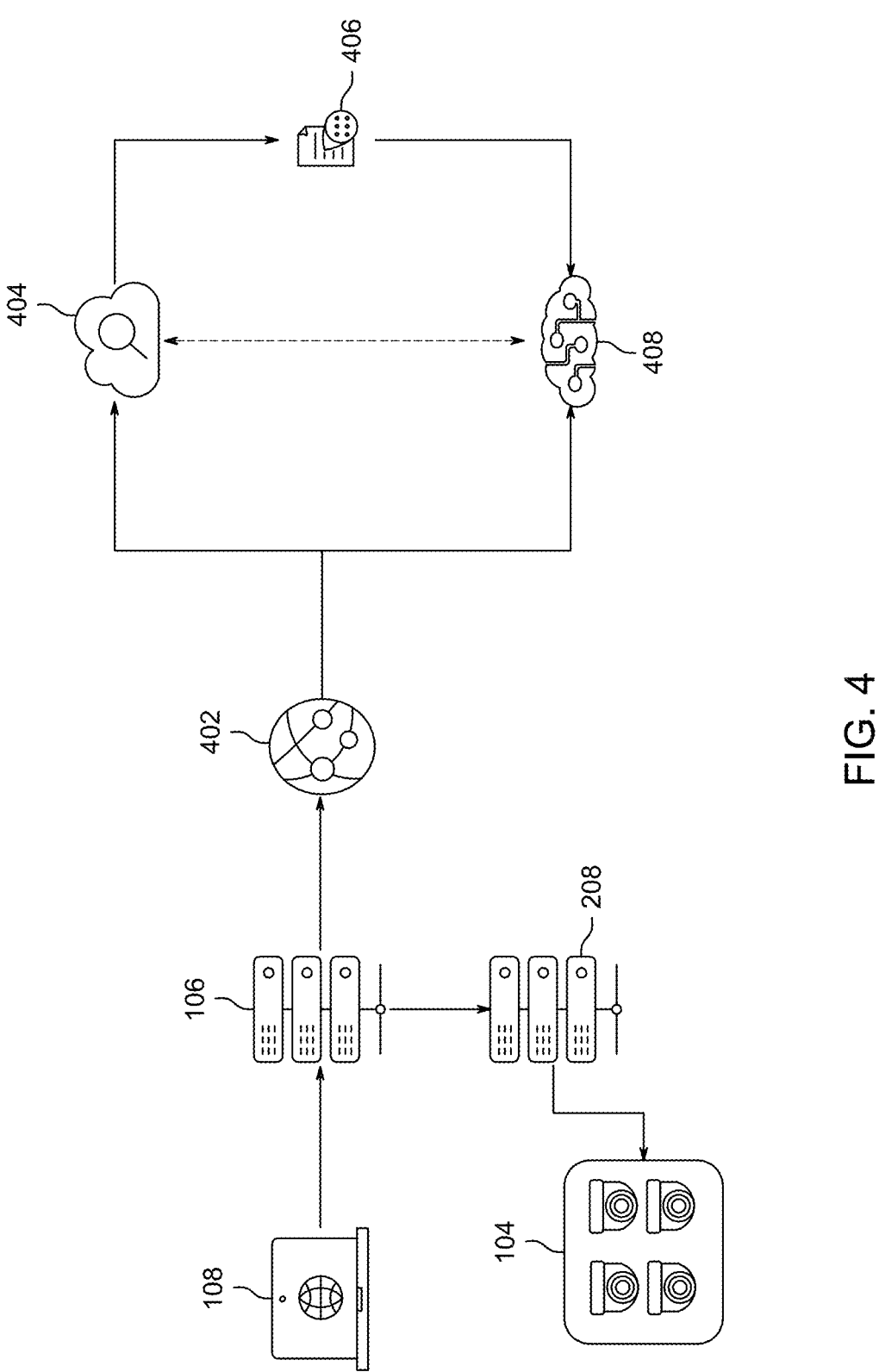
Figure 5:
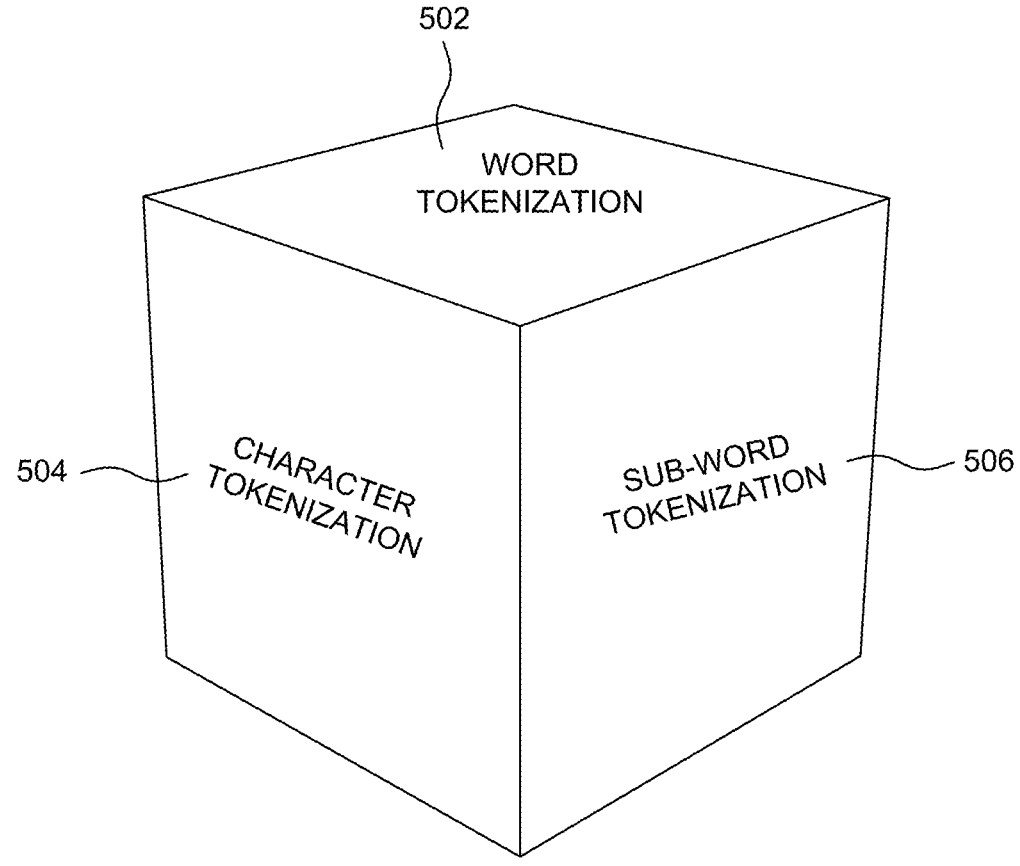
Figure 6:
Figure 7:
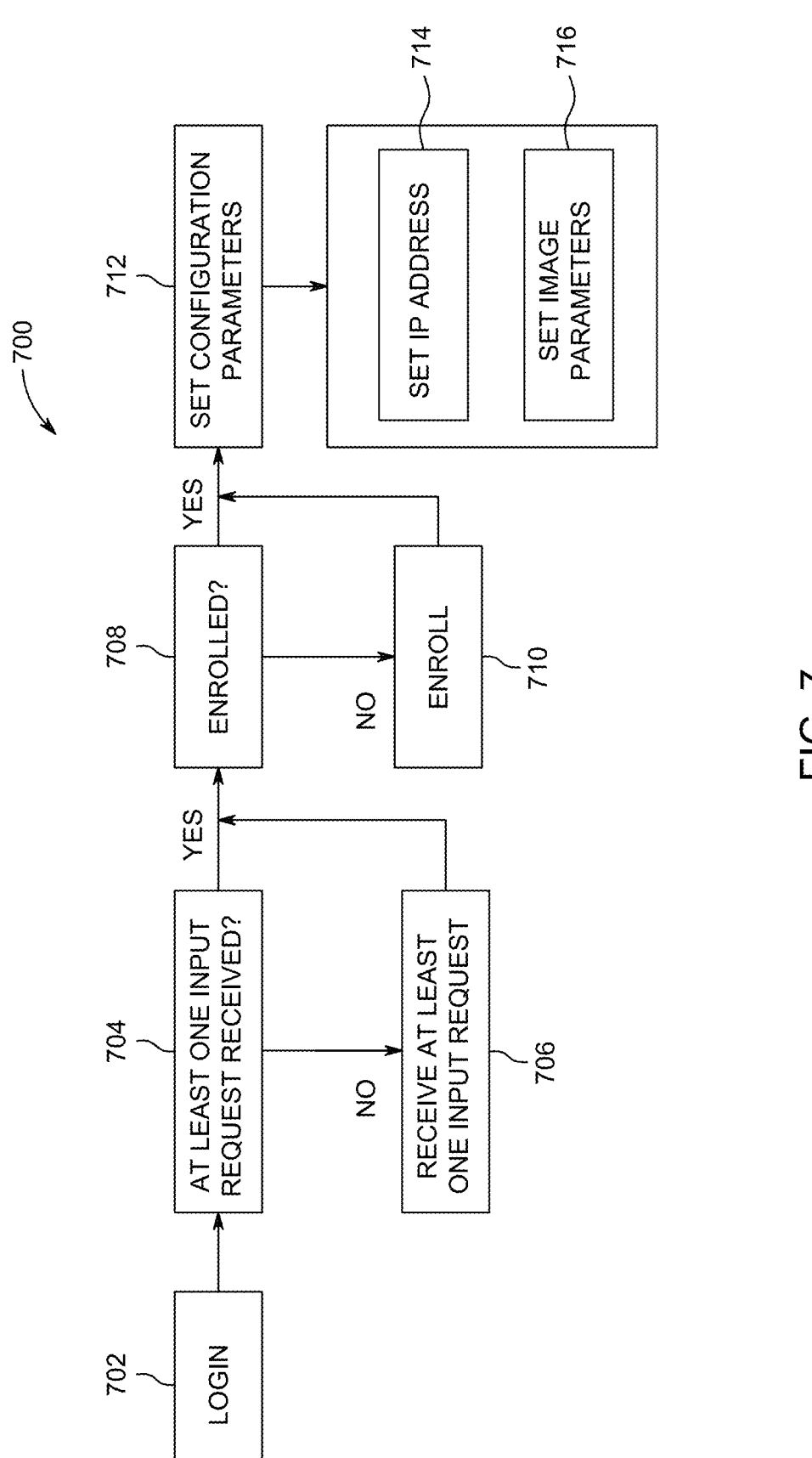

Having thus described certain example embodiments of the present disclosure in general terms, reference will hereinafter be made to the accompanying drawings, which are not necessarily drawn to scale, and wherein:

FIG. 1 illustrates a network diagram of a system showing one or more components for configuring and enrolling one or more image capturing devices using artificial intelligence (AI) in accordance with an example embodiment of the present disclosure;

FIG. 2 illustrates a block diagram of a server for configuring and enrolling the one or more image capturing devices in accordance with an example embodiment of the present disclosure;

FIG. 3 illustrates a system architecture for configuring and enrolling the one or more image capturing devices in accordance with an example embodiment of the present disclosure;

FIG. 4 illustrates a conceptual architecture of the system for configuring and enrolling the one or more image capturing devices in accordance with an example embodiment of the present disclosure;

FIG. 5 illustrates sub-division in tokenization of one or more commands of at least one input request received by the server in accordance with an example embodiment of the present disclosure;

FIG. 6 illustrates an exemplary scenario showing multimedia data captured by the one or more image capturing devices in accordance with an example embodiment of the present disclosure;

FIG. 7 illustrates a block diagram of a system for configuring and enrolling the one or more image capturing devices in accordance with an example embodiment of the present disclosure; and FIG. 8 illustrates a flowchart showing a method for configuring and enrolling the one or more image capturing devices in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various embodiments of methods and systems for configuration and enrollment of image capturing devices using artificial intelligence (AI). Embodiments may be configured to receive at least one input request from a user. Embodiments may be configured to determine a position and a placement of the one or more image capturing devices based at least on one or more multimedia data captured by the one or more image capturing devices and at least one input request, using a video cognitive module. The multimedia data may comprise at least one of one or more snapshots and video footages captured by the one or more image capturing devices. Embodiments may be further configured to generate a configuration data sheet for the one or more image capturing devices based at least on one or more data sets and the position and the placement of the one or more image capturing devices, using an artificial intelligence (AI) module. The one or more datasets may comprise at least one of a product user guide, product database schemas, product database configuration scripts, or camera configuration templates. Further, embodiments may be configured to initiate the configuration and the enrollment of the one or more image capturing devices based at least on the generated configuration data sheet using a camera module.

Embodiments may be configured to convert the at least one input request into one or more commands using an artificial intelligence (AI)/machine learning (ML) technique. Embodiments may be further configured to tokenize the one or more commands using the AI module into a word tokenization, a character tokenization, and a sub-word tokenization. Embodiments may be further configured to display the configuration data sheet to the user on a user device for validation and confirmation on the configuration and enrollment of the one or more image capturing devices.

FIG. 1 illustrates a network diagram of a system 100 showing one or more components for configuring and enrolling one or more image capturing devices using artificial intelligence (AI), in accordance with an example embodiment of the present disclosure. The system 100 may comprise a network 102 communicatively coupled to one or more image capturing devices 104. Further, the system 100 may comprise a server 106 and a user device 108.

In some embodiments, the network 102 may be a communication network such as internet or a cloud network, that may be configured to allow computing devices and processing systems to communicate with each other through wired network, wireless network, or a combination of both. In some embodiments, the network 102 may refer to as a distributed infrastructure that is configured to exchange of data, information, and resources among interconnected computing devices and systems. The network 102 may be designed to facilitate communication and collaboration across various locations, devices, and platforms. Those skilled in the art will recognize that wired devices may include, but are not limited to, wired networks such as Wide Area Networks (WANs) or Local Area Networks (LANs), while wireless devices may include wireless communications established via Radio Frequency (RF) signals or infrared (IR) signals. Various components in the system 100 may connect to the network 102 in accordance with various wired and wireless communication protocols such as Transmission Control Protocol and Internet Protocol (TCP/IP), User Datagram Protocol (UDP), and 2G, 3G, or 4G communication protocols.

Further, the system 100 may comprise the one or more image capturing devices 104. In some embodiments, the one or more image capturing devices 104 may be a security and safety system designed to detect and monitor potential threats, emergencies, or unauthorized access. The one or more image capturing devices 104 may correspond to closed circuit television (CCTV) cameras. The one or more image capturing devices 104 may comprise thousands of cameras. In some embodiments, the one or more image capturing devices 104 may be installed in various types of buildings, including residential homes, commercial establishments, industrial facilities, workplaces, and institutional buildings. The one or more image capturing devices 104 may further be installed in an open area, including parking lots, entry points, garage, driveway, back garden of the house, approaches to the house, and areas next to public walkways. The one or more image capturing devices 104 may be mounted on walls, ceilings, or poles, allowing for flexible placement of the one or more image capturing devices 104 to achieve optimal coverage of a field of view (FOV). It may be noted that applications of the one or more image capturing devices 104 may further include monitoring traffic, crime prevention, safety assessment, mobile surveillance, and security, without departing from the scope of the disclosure.

In some embodiments, the one or more image capturing devices 104 may capture multimedia data. The multimedia data may comprise at least one of one or more snapshots and video footages captured by the one or more image capturing devices 104. The captured multimedia may be used to determine placement and position of the one or more image capturing devices 104. The one or more image capturing devices 104 may capture clear and the detailed multimedia. Further, the one or more image capturing devices 104 may be communicatively coupled to the network 102 through internet protocol (IP) address. In some embodiments, the one or more image capturing devices 104 may be equipped with security features. The security features may comprise encryption and authentication protocols to ensure the integrity and confidentiality of the captured multimedia data.

In some embodiments, the server 106 may be a computer or software module that is configured to provide centralized resources, data, or services to the user device 108 operated by the user. The server 106 may be configured to handle and manage one or more computational tasks and data processing within the system 100. In some embodiments, the server 106 may include storage systems, such as hard drives or storage arrays, to store and manage large volumes of data and information accessible to network users. In some embodiments, the server 106 may further provide centralized control and management capabilities, allowing network administrators to configure, monitor, and maintain network resources, security settings, and user access permissions from a single location.

In some embodiments, the server 106 may comprise a memory, and at least one processor. The at least one processor may be communicatively coupled to the memory. In some embodiments, the server 106 may be configured to receive at least one input request from the user. The at least one input request may correspond to a textual input related to the configuration and enrollment of the one or more image capturing devices 104. The user may be an end user or an administrator for installing the one or more image capturing devices 104. Further, the at least one input request may comprise at least one of the IP address or a range of IP addresses associated with the one or more image capturing devices 104 to be configured and enrolled. In one example, the IP address may correspond to 10.75.50.X. Further, the at least one input request may correspond to enroll the one or more image capturing devices 104 10.75.50.X and configure with configuration settings i.e., ideal configuration settings.

Further, the server 106 may be configured to determine the position and the placement of the one or more image capturing devices 104 based at least on the multimedia data captured by the one or more image capturing devices 104 and at least one input request, using a video cognitive module. The video cognitive module is further described in greater detail in FIGS. 2 and 3. The server 106 may be configured to tokenize the one or more commands using the AI module. The one or more commands may be tokenized into a word tokenization, a character tokenization, and a sub-word tokenization.

In some embodiments, the server 106 may be configured to generate a configuration data sheet for the one or more image capturing devices 104 based at least on one or more datasets and the position and the placement of the one or more image capturing devices 104, using an artificial intelligence (AI) module. Further, the configuration data sheet for the one or more image capturing devices 104 may comprise configuration settings of the one or more image capturing devices 104. The configuration settings may further comprise at least one of one or more resolution settings, one or more framerate settings, and group of picture (GOP) settings.

In some embodiments, the server 106 may be configured to initiate the configuration and the enrollment of the one or more image capturing devices 104 based at least on the generated configuration data sheet using a camera module. In some embodiments, the server 106 may be configured to display the configuration data sheet to the user on the user device 108 for validation and confirmation on the configuration and enrollment of the one or more image capturing devices 104. In some embodiments, the server 106 may be configured to convert the at least one input request into the one or more commands using the Artificial Intelligence (AI)/Machine Learning (ML) techniques. In some embodiments, the server 106 may correspond to an application server.

In one example embodiment, the one or more AI/ML techniques may correspond to natural language processing (NLP), clustering or unsupervised learning, reinforcement learning (RL) or any other AI/ML techniques known in the art. For instance, the NLP may enable the server 106 to convert at least one input request into one or more commands. Additionally, clustering or unsupervised learning may be employed to analyze the multimedia data captured by the one or more image capturing devices 104 and determines the position and placement of the one or more image capturing devices 104. Further, categorize the multimedia data based on similarity or patterns, to facilitate the identification of recurring issues or anomalies. Furthermore, the RL technique may be utilized to dynamically optimize the placement and position of the one or more image capturing devices 104 to optimize the server 106 performance over time. The one or more AI/ML techniques may enable the server 106 to autonomously learn, adapt, and improve the configuration and enrollment process, to provide actionable insights and support proactive maintenance efforts.

In some embodiments, the server 106 may further be configured to accepts the at least one input request from the user device 108. The user device 108 comprises a graphical user interface (GUI) that provides a user-friendly platform for the user to input the at least one input request and interact with the system 100. The GUI may be web-based, accessed through a browser, or through a dedicated software application installed on desktop computers, laptops, tablets, or smartphone. The user device 108 may be equipped by a user or other service professionals responsible for configuring and enrolling the one or more image capturing devices 104. In some embodiments, the enrollment and the configuration of the plurality of image capturing devices 104 via the server 106 may provide a summarized data to the user that is easy to enroll and configure the one or more image capturing devices 104. In some embodiments, the user device 108 may include personal computers such as desktop computers, laptop computers, tablets, smartphones, or mobile devices.

It will be apparent to one skilled in the art that above-mentioned components of the system 100 have been provided only for illustration purposes, without departing from the scope of the disclosure.

FIG. 2 illustrates a block diagram of the server 106 for configuring and enrolling the one or more image capturing devices 104, in accordance with an example embodiment of the present disclosure. The server 106 may comprise at least one processor 200 and a memory 202. FIG. 3 illustrates a system architecture for configuring and enrolling the one or more image capturing devices 104, in accordance with an example embodiment of the present disclosure. FIGS. 2-3 are described in conjunction with FIG. 1.

In some embodiments, the at least one processor 200 may correspond to a controller for executing one or more operations within the server 106. In some embodiments, the at least one processor 200 may be configured to receive the at least one input request from a user 302 via the user device 108. The at least one input request may correspond to a command given by the user for configuration and enrollment of the one or more image capturing devices 104. The at least one input request may include information such as IP addresses or ranges associated with the one or more image capturing devices 104. In some embodiments, the user may use the user device 108 for entering the IP addresses for a particular image capturing device from the one or more image capturing devices 104. In some embodiments, the user 302 may be enabled to enter at least one or multiple IP addresses corresponding to respective image capturing devices from the one or more image capturing devices 104.

In some embodiments, the at least one processor 200 may further convert the at least one input request into the one or more commands using the artificial intelligence (AI)/machine learning (ML) techniques. In some embodiments, the at least one processor 200 may tokenize the one or more commands using an AI module 204 into a word tokenization, a character tokenization, and a sub-word tokenization. Further, the at least one processor 200 is configured to extract actionable insights from the one or more commands using the AI module 204. The at least one processor 200 with the help of the AI module 204 separates the text based on nature breaks. Further, breaks the text into individual characters and further divides the words using linguistic rules.

Further, the at least one processor 200 may be configured to send a request to a video cognitive module 206 for fetching at least one multimedia data from the one or more image capturing device 104 via using the AI module 204. In some embodiments, upon receiving the instructions, the video cognitive module 206 is configured to send a command to the one or more image capturing devices 104 to capture the at least one multimedia data. The multimedia data may comprise at least a snapshot, a video etc. Further, the at least one processor 200 determines the position and the placement of the one or more image capturing devices 104 based at least on the multimedia data captured by the one or more image capturing devices 104 and at least one input request, using the video cognitive module 206.

In some embodiments, after receiving the multimedia data, the at least one processor 200 with the help of the video cognitive module 206, analyses the multimedia data captured by the one or more image capturing devices 104. It may be noted that the video cognitive module 206 starts to analyze the multimedia data upon receiving the command from the at least one processor 200 via the AI module. Based on the analysis of the multimedia data and the at least one input request, the system 100 may determine the position and the placement for enrolling the one or more image capturing devices 104 within the system 100.

Successively, the at least one processor 200 may generate the configuration data sheet for the enrolled one or more image capturing devices 104 using the AI module 204. In some embodiments, the configuration data sheet may be generated based at least on one or more datasets, the determined position and placement of the one or more image capturing devices 104. The generated configuration data sheet are based on one or more datasets, which may include product specifications, database schemas, or configuration templates. The generated configuration data sheet may incorporate recommended configuration settings and deployment locations derived from the position and the placement of the one or more image capturing devices 104.

In some embodiments, the at least one processor 200 may initiate the configuration and the enrollment of the one or more image capturing devices 104 based at least on the generated configuration data sheet using a camera module 208. In some embodiments, after the configuration data sheet is prepared, the at least one processor 200 may initiate the configuration and enrollment of the one or more image capturing devices 104. The process of initiating the configuration and enrollment of the one or more image capturing devices 104 may be facilitated by the camera module 208. Based on the configuration and enrollment of the one or more image capturing devices 104, the user device 108 may display the generated configuration data sheet to the user 302 for validation and confirmation. The configuration data sheet may be presented in a structured format, incorporating details such as the one or more image capturing devices 104 configuration settings and the deployment locations. The user 302 may review and edit the configuration and the enrollment settings as needed before confirming the acceptance, using the user device 108.

In some embodiments, the user device 108 may provide feedback mechanisms for the user 302 to report issues encountered or suggest improvements. Additionally, the user device 108 may implement security measures. The security measures may correspond to authentication mechanisms and data encryption protocols to ensure the security and integrity of the configuration and enrollment process of the one or more image capturing devices 104. In some embodiments, the authentication mechanisms may be implemented to verify the identity of user 302 accessing the system 100, thereby preventing unauthorized user 302 from tampering with the one or more image capturing devices 104 configurations or enrollment. Authentication may involve requiring the user 302 to provide unique login credentials or employing multi-factor authentication methods for added security.

Further, data encryption protocols may be utilized to encrypt sensitive information transmitted between the user device 108 and the system 100 during the configuration and enrollment process. By encrypting data in transit, the system 100 may prevent unauthorized access or interception of configuration data, safeguarding the sensitive information from potential security threats. The implementation of authentication mechanisms and data encryption protocols may enhance the security of the system 100, ensuring the configuration and enrollment process of the one or more image capturing devices 104 may remain secure and protected against unauthorized access or tampering.

In one example embodiment, the one or more AI/ML techniques may correspond to natural language processing (NLP), clustering or unsupervised learning, reinforcement learning (RL) or any other AI/ML techniques known in the art. For instance, the NLP may enable the system 100 to convert at least one input request into one or more commands. Additionally, clustering or unsupervised learning may be employed to analyze the multimedia data captured by the one or more image capturing devices 104 and determines the position and placement of the one or more image capturing devices 104, and categorize the multimedia data based on similarity or patterns, to facilitate the identification of recurring issues or anomalies. Furthermore, the RL technique may be utilized to dynamically optimize the placement and position of the one or more image capturing devices 104 to optimize the performance over time. The one or more AI/ML techniques may enable a video management system to autonomously learn, adapt, and improve the configuration and enrollment process, to provide actionable insights and support proactive maintenance efforts.

The at least one processor 200 may include suitable logic, circuitry, and/or interfaces that are operable to execute one or more instructions stored in the memory 202 to perform predetermined operations. In some embodiments, the at least one processor 200 may be configured to store the multimedia data, the configuration data sheet, at least one input request, and the one or more datasets in the memory 202 communicatively coupled to the at least one processor 200. In one embodiment, the at least one processor 200 may be configured to decode and execute any instructions received from one or more other electronic devices or server(s). The at least one processor 200 may be configured to execute one or more computer-readable program instructions, such as program instructions to carry out any of the functions described in this description. Further, the processor may be implemented using the at least one processor 200 technologies known in the art. Examples of the at least one processor 200 include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

In some embodiments, the memory 202 may be configured to store a set of instructions and data executed by the at least one processor 200. Further, the memory 202 may include the one or more instructions that are executable by the at least one processor 200 to perform specific operations. The memory 202 may be configured to store the at least one input request received from the user 302. The memory 202 may be configured to include the instructions to receive the at least one input request corresponding to the configuration and enrollment of the one or more image capturing devices 104. The memory 202 may be configured to include the instructions to store each of the multimedia data. The multimedia data may comprise at least one of the one or more snapshots and video footages captured by the one or more image capturing device 104. Further, the memory 202 may be configured to include the instructions to receive the configuration data sheet corresponding to the one or more datasets.

The memory 202 may be configured to include the instructions to execute the ideal configuration and enrollment process of the one or more image capturing devices 104 based at least on the one or more datasets and the position and the placement of the one or more image capturing devices 104, including the generated configuration data sheets. It is apparent to a person with ordinary skill in the art that the one or more instructions stored in the memory 202 enable the hardware of the server 106 to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In some embodiments, the video cognitive module 206 may fetch the multimedia data captured by the one or more image capturing devices 104. The video cognitive module 206 may analyze and process the multimedia data captured by the one or more image capturing devices 104. The video cognitive module 206 may identify and label the multimedia data using one or more AI techniques. The one or more AI techniques may include at least one of object detection and scene classification.

In some embodiments, the video cognitive module 206 may determine context of scene of the captured multimedia data, and may distinguish between the scene of the multimedia data captured by the one or more image capturing devices 104. The video cognitive module 206 may utilize the one or more AI techniques to analyze and interpret the captured multimedia data from the one or more image capturing devices 104. In some embodiments, through the one or more AI techniques, the video cognitive module 206 may accurately determine the context of the scene depicted in the multimedia data. The one or more AI techniques may comprise deep learning algorithms and computer vision techniques. Further, the deep learning algorithms may comprise convolutional neural networks (CNNs). The deep learning algorithms may be trained on datasets to recognize patterns and features within the multimedia data, enabling the video cognitive module 206 to identify objects, environments, and activities depicted in the scene. Further, the video cognitive module 206 may leverage computer vision algorithms to extract semantic information from the multimedia data, allowing the video cognitive module 206 to discern between different scenes and environments captured by the one or more image capturing devices 104. By combining the one or more AI techniques, the video cognitive module 206 may effectively distinguish between the scenes based on visual cues and contextual information present in the multimedia data.

The scene of the multimedia captured by the one or more image capturing devices 104 may include parking lots, lift lobby areas, receptions, and workplaces. The video cognitive module 206 may identify one or more objects within the scene of the multimedia data. In one example, the one or more objects within the scene may comprise vehicles in parking lots, people in reception areas, or equipment in workplaces. The identification of the scene within the multimedia data may enable the video cognitive module 206 to determine the placement and the position of the one or more image capturing images 104 from the scene within the multimedia data. In some embodiments, the video cognitive module 206 may be communicatively coupled to the at least one processor 200 and the memory 202. The video cognitive module 206 may provide metadata to generate the configuration data sheet.

Further, the server 106 may comprise the AI module 204. In some embodiments, the AI module 204 within the server 106 may leverage advanced language understanding capabilities to streamline the process of configuring and enrolling the one or more image capturing devices 104. The AI module 204 may be trained with a diverse range of data sources including, large language models (LLM), product user-guides, product database schemas, product database configuration scripts, and camera configuration templates. The AI module 204 may further have equipped with providing a thorough understanding of the one or more image capturing devices 104 and the enrollment and configurations of the one or more image capturing devices 104. In some embodiments, the AI module 204 may correspond to a generative AI server.

Further, the AI module 204 may generate actionable outputs in the form of the configuration data sheet. In some embodiments, leveraging the understanding of the one or more image capturing devices 104 and the configuration requirements, the AI module 204 may compile the configuration data sheet. The configuration data sheet may encompass necessary settings and parameters of the one or more image capturing devices 104. The configuration data sheets may be structured in a user-friendly format, for efficient enrollment and configuration of the one or more image capturing devices 104.

In some embodiments, the AI module 204 may serve as the cognitive engine driving the automation of the one or more image capturing devices 104 for configuration and enrollment process. By harnessing the extensive knowledge base and advanced language processing capabilities, the AI module 204 enhances the efficiency, accuracy, and user-friendliness of the system 100, ultimately leading to optimized surveillance infrastructure and enhanced security capabilities.

In some embodiments, the camera module 208 may be communicatively coupled to the at least one processor 200, the memory 202, and the video cognitive module 206. In some embodiments, the camera module 208 may manage connections to the one or more image capturing devices 104 within the system 100. The camera module 208 may utilize network protocols, including hypertext transfer protocol (HTTP), real time streaming protocol (RTSP), or open network video interface forum (ONVIF) to establish communication with the cameras and retrieve data. In some embodiments, the camera module 208 may handle the configuration of the one or more image capturing devices 104 based at least on the generated configuration data sheet. The camera module 208 based on the configuration data sheet received by the at least one processor 200 from the AI module 204, may configure and enrol the one or more image capturing devices 104 to apply ideal configuration settings. The ideal configuration settings may include resolution, supported frame rate, and codecs.

The camera module 208 may further control the streaming functionality of the one or more image capturing devices 104. The camera module 208 may send the one or more commands to the one or more image capturing devices 104 to initiate streaming sessions and to retrieve the multimedia data based at least on the at least one input request. In some embodiments, the camera module 208 may incorporate mechanisms for error handling and recovery to ensure the reliability of the one or more image capturing devices 104 connections and the multimedia data retrieval processes. The camera module 208 may further monitor the status of the one or more image capturing devices 104 connections and detects issues. The issues may correspond to network errors or the one or more image capturing devices 104 malfunctions. In some embodiments, in case of the issues or the network errors, the camera module 208 may attempt to re-establish connections or notify the user 302.

In some embodiments, the server 106 may further comprise an input/output circuitry 210. The input/output circuitry 210 may enable a user to communicate or interface with the system 100, via the user device 108. The user device 108 may include N number of user devices. In some embodiments, the input/output circuitry 210 may act as a medium to transmit input from the interface to and from the system 100. In some embodiments, the input/output circuitry 210 may refer to the hardware and software components that facilitate the exchange of information between the user device and the system 100. In one example, the system 100 may include a graphical user interface (GUI) (not shown) as input circuitry to allow the users to input data. The input/output circuitry 210 may include various input devices such as keyboards, barcode scanners, GUI for the users to provide data and various output devices such as displays, printers for the one or more users to receive data. In another example, the input/output circuitry 210 may include various output circuitry such as a display. In one example, the input/output circuitry 210 may interface with the one or more image capturing devices 104 to receive the multimedia data as input. The at least one processor 200 may process the multimedia data, analyzes the processed multimedia data using AI algorithms, and may generate output signals to control the configuration and enrollment of the one or more image capturing devices 104. The input/output circuitry 210 may further display relevant information to the user on the user device 108.

In some embodiments, the server 106 may further comprise a communication circuitry 212. The communication circuitry 212 may allow the server 106 to exchange data or information with other systems or apparatuses. Further, the communication circuitry 212 may include network interfaces, protocols, and software modules responsible for sending and receiving data or information. In some embodiments, the communication circuitry 212 may include Ethernet ports, Wi-Fi adapters, or communication protocols like HTTP or MQTT for connecting with other systems. The communication circuitry 212 may further include components such as communication modules (e.g., Wi-Fi, Ethernet, cellular), transceivers, antennas, and protocols (e.g., TCP/IP, MQTT, SNMP) for exchanging data with other systems or network devices. The communication circuitry 212 may allow the system 100 to stay up-to-date. In some embodiments, the communication circuitry 212 may enable seamless communication between the user device 108, the camera module 208, and the one or more image capturing devices 104. The communication circuitry 212 may further ensure the configuration data, and the multimedia data may transmit securely and efficiently between the user device 108, the camera module 208, and the one or more image capturing devices 104.

It will be apparent to one skilled in the art the above-mentioned components of the server 106 have been provided only for illustration purposes, without departing from the scope of the disclosure.

In some embodiments, the system 100 may provide an interactive chat capability, where the user 302 may provide the at least one input request to the system 100 to enroll and configure the one or more image capturing devices 104 into the system 100. In one example, the at least input request may comprise "enroll cameras with IP range 10.75.87.X and configure with best suitable settings." Further, the system 100 may transform the at least one input request into the one or more commands and, and may further queue the one or more commands for execution, using the AI module 204. In some embodiments, upon completing the configuration and enrollment of the one or more image capturing devices 104, the system 100 may notify the user 302 with a notification. In one example, the notification may correspond to a notification bubble. The notification may correspond to the changes in the system 100 configuration. In one example, the user 302 may refresh the system 100 to see the changes in the system 100 configuration. In another example, the system 100 may automatically refresh and show the changes in the system 100 configuration.

FIG. 4 illustrates a conceptual architecture of the system 100 for configuring and enrolling the one or more image capturing devices 104, in accordance with an example embodiment of the present disclosure. FIG. 5 illustrates sub-division in tokenization of one or more commands of at least one input request received by the server 106, in accordance with an example embodiment of the present disclosure. FIG. 6 illustrates an exemplary scenario showing multimedia data 600 captured by the one or more image capturing devices 104, in accordance with an example embodiment of the present disclosure.

As illustrated in FIG. 2, the server 106 may be configured to receive the at least one input request from the user device 108. The user device 108 comprises a graphical user interface (GUI) that provides a user-friendly platform for the user 302 to input the at least one input request and interact with the system 100. The GUI may be web-based, accessed through a browser, or through a dedicated software application installed on desktop computers, laptops, tablets, or smartphone. The at least one input request may correspond to a textual input related to the configuration and enrollment of the one or more image capturing devices 104. The at least one user request may further correspond to configuration and enrollment of the one or more image capturing devices 104.

In some embodiments, the camera module 208 may be communicatively coupled to the one or more image capturing devices 104. The camera module 208 may manage connections to the one or more image capturing devices 104 within the system 100. The camera module 208 may utilize network protocols, including hypertext transfer protocol (HTTP), real time streaming protocol (RTSP), or open network video interface forum (ONVIF) to establish communication with the cameras and retrieve data. In some embodiments, the camera module 208 may handle the configuration of the one or more image capturing devices 104 based at least on the generated configuration data sheet by the server 106. The camera module 208 may send the configuration one or more commands to the one or more image capturing devices 104 to apply ideal configuration settings.

The camera module 208 may further control the streaming functionality of the one or more image capturing devices 104. Further, the camera module 208 may retrieve the multimedia data. The camera module 208 may send the one or more commands to the one or more image capturing devices 104 to initiate streaming sessions and to retrieve the multimedia data based at least on the at least one input request as shown in FIG. 6.

In an example, the multimedia data 600 corresponds to a snapshot. The snapshot may further correspond to a shopping mall. The shopping mall may further correspond to a bustling shopping mall. The one or more image capturing devices 104 positioned within the shopping mall may capture the multimedia data. The multimedia data 600 may comprise one or more stores and one or more people engaged in one or more activities. Further, the multimedia data 600 may provide a visual representation of the surroundings. In some embodiments, the one or more people may move about the shopping mall. Further, the one or more people may browse through the one or more stores and may interact with one another. Further, the at least one processor 200 may analyze field of view (FOV) of the one or more image capturing devices 104.

In some embodiments, using the AI/ML techniques, the system 100 automatically identifies the context of the captured multimedia data 600. The system 100 may identify the context of the captured multimedia data 600 by recognizing objects. The objects may correspond to the one or more stores' fronts, walkways, and gathering spaces. In some embodiments, based at least on the identified context of the captured multimedia data 600, the system 100 may configure the one or more image capturing devices 104 with the ideal configuration settings. In some embodiments, by automatically configuring the one or more image capturing devices 104 based at least on the identified context, the system 100 ensures effective surveillance coverage throughout the shopping mall.

In some embodiments, an application server 402 may be configured to manage and coordinate the one or more functionalities and processes of the system 100. The application server 402 may be configured to facilitate communication between the one or more modules and components of the system 100. The one or more modules may correspond to the AI module 204, the video cognitive module 206, and the camera module 208. Further, the one or more components may correspond to the user device 108, and the server 106. The application server 402 may receive the at least one input request from the user device 108, via the server 106. Further, the application server 402 may be configured to store and manage the configuration settings, the metadata, and other information within the system 100. In some embodiments, the application server 402 may support multiple programming languages and frameworks including .NET, .NET Core, Java, Node.js, PHP, Python, and Ruby.

In some embodiments, a cognitive service 404 may be configured to enable advanced analysis of the multimedia data captured by the one or more image capturing devices 104. The cognitive service 404 may leverage machine learning (ML) algorithms and computer vision techniques to extract valuable insights from the at least one multimedia data. The valuable insights may correspond to identifying the objects, and understanding contextual information of the multimedia data. In some embodiments, the video cognitive module 206 may utilize the cognitive service 404 to analyze the multimedia data captured by the one or more image capturing devices 104. In an example, the cognitive service 404 may automatically recognize the placements and the positions of the camera. The placements and the positions may correspond to the parking lots, the reception areas, or the workplace settings.

In some embodiments, the extracts from the at least one multimedia data may be stored with data 406 in the memory 202 and may be configured to provide a guide for configuring and enrolling the one or more image capturing devices 104. For example, the output may include commands to enroll specific the one or more image capturing devices 104 models, and configure the one or more image capturing devices 104 with optimized settings based on the intended placements and positions of the one or more image capturing devices 104. In some embodiments, the user 302 may give command to the cognitive service 404, via the application server 402. The command may correspond to one or more queries. Further, the cognitive service 404 may receive the one or more queries and may process the received one or more queries. Further, the data may be further used by an AI service 408. The AI service 408 may be configured to prompt one or more information that may be required by the user 302. The user 302 may give input commands to the AI service 408 that may further prompt the data to the user in the form of information related to one or more image capturing devices 104 determined from the cognitive service 404.

In some embodiments, the at least one processor 200 may tokenize the one or more commands using the AI module 204 into a word tokenization 502, a character tokenization 504, and a sub-word tokenization 506. In some embodiments, the word tokenization 502 may separate the at least one input request based at least on the natural breaks. The natural breaks may include spaces, or punctuation marks. In some embodiments, the character tokenization 504 may break the at least one input request into individual characters. In some embodiments, the sub-word tokenization 506 may further divide the at least one input request using linguistic rules. The linguistic rules may correspond to affixes.

Further, the system 100 may use natural language processing (NLP). The NLP is an application of variational Autoencoders (VAEs). The VAEs may correspond to the AI module 204 to process the at least one input request. The AI module 204 may further correspond to the generative AI model to process the at least one input request. In some embodiments, the tokenization of the one or more commands may extract actionable insights from the at least one input request. In some embodiments, the tokenization of the one or more commands may break down the one or more commands into one or more tokens. The tokenization of the one or more commands may be further analyzed and processed by the at least one processor 200.

In one example, the at least one input request may include "enroll cameras 10.75. 50.X and configure with best suitable settings." In some embodiments, tokenization may result in "enroll", "camera", "10.75.50.X", "configure", and "best suitable settings". The tokenization process may identify one or more actions. The one or more actions may correspond to "enroll" and "configure." The one or more actions may further correspond to one or more operations to be performed on the one or more image capturing devices 104. Further the token camera may identify the type of device to be enrolled and configured. 10.75.50.X token may further represent the IP address or the range of IP addresses associated with the one or more image capturing devices to be enrolled and configured. The IP address or the range of IP addresses may be evaluated to ensure connectivity of the one or more image capturing devices 104 within the system 100.

Further, the token "best suitable settings" may represent the configuration parameters. The best suitable settings token may determine the ideal configuration parameters based on one or more factors. The one or more factors may correspond to environmental conditions, surveillance requirements, and the system 100 capabilities. Further, the tokens may be evaluated and processed using the AI module 204. In some embodiments, based at least on the evaluated tokens from the AI module 204, the system 100 may proceed to configure and enroll the one or more image capturing devices 104 with the identified IP address or the range of IP addresses. The best suitable settings parameter may optimize the performance and functionality of the enrolled one or more image capturing devices 104. Further, the system 100 may ensure that the one or more image capturing devices 104 are successfully enrolled into the system 100 and are configured according to the represented configuration parameters.

In another example, the system 100 may be configured to configure and enroll the one or more image capturing devices 104. The one or more image capturing devices may be placed strategically throughout a building. The building may correspond to the parking lot, lift lobby, fire exit, staircase well, reception, and entrance. Further, the one or more image capturing devices 104 may have different models and capabilities, based at least one the respective functions of the one or more image capturing devices 104 system 100. In some embodiments, the enrollment of the one or more image capturing devices 104 may involve updating the system 100 with the capabilities of each model of the one or more image capturing devices 104. Enrollment of the one or more image capturing devices may be performed individually for each model of the one or more image capturing devices 104.

In some embodiments, the one or more image capturing devices 104 may be configured within the system 100 with the enrolled model of the one or more image capturing devices 104. Further, the configuration parameters may adjust based at least on the one or more factors. The one or more factors may correspond to placement, the position, and intended purpose of the one or more image capturing devices 104 within the building. In one example, the one or more image capturing devices 104 may be placed at an entrance/exit gate. The one or more image capturing devices 104 placed at the entrance/exit gate may require specific configuration settings to effectively capture vehicle number plates. The specific configuration settings may include high-resolution settings, a higher frame rate, and appropriate group of pictures (GOP) values.

In another example embodiment, the one or more image capturing devices 104 may be placed in the parking lot. The one or more image capturing devices 104 placed in the parking lot may require specific configuration settings. The specific configuration settings may include lower resolution settings and lower frame rate for monitoring wider areas. In some embodiments, the at least one processor 200 may analyze the multimedia data captured by each of the one or more image capturing devices 104 to identify the placement and position of the one or more image capturing devices 104. Further, based at least on the placement and the position of the one or more image capturing devices 104, the system 100 may automatically configure each of the one or more image capturing devices 104 with the best configuration parameters.

FIG. 7 illustrates a block diagram 700 of the system 100 for configuring and enrolling the one or more image capturing devices, in accordance with an example embodiment of the present disclosure. FIG. 7 is described in conjunction with FIGS. 1-6.

At operation 702, the at least one processor may be configured to allow the user 302 to login into the user device 108. The user 302 may login into the user device 108 using one or more credentials. The one or more credentials may comprise user ID and password. In some embodiments, login into the user device 108 may corresponds to the user 302 accessing the user device 108 interface and providing login credentials to authenticate themselves. In some embodiments, the user 302 may login into the user device 108 to configure and enroll the one or more image capturing devices 104.

At operation 704, the at least one processor 200 may be configured to determine whether the at least one input request from the user 302 is received or not. In one aspect, the at least one processor 200 upon detecting at least one input request, may direct to step 708. In another aspect, the at least one processor 200 upon not detecting the at least one input request from the user 302, the at least one processor 200 may direct at operation 706.

At operation 706, the at least one processor may be configured to receive the at least one input request. The at least one input request may correspond to enrollment, configuration, or other commands related to the one or more image capturing devices 104. In some embodiments, the at least one input request may include information such as IP addresses or ranges associated with the one or more image capturing devices 104. In some embodiments, the user 302 may use the user device 108 for entering these IP addresses for a particular image capturing device from the one or more image capturing devices 104. In some embodiments, the user 302 may be enabled to enter at least one or multiple IP addresses corresponding to respective image capturing devices from the one or more image capturing devices 104.

At operation 708, the at least one processor 200 may be configured to determine whether the one or more image capturing devices 104 are enrolled in the system 100 or not. In one aspect, the at least one processor 200 upon detecting the one or more image capturing devices 104, may direct at step 712 for setting configuration parameters. In other aspect, the at least one processor 200 upon not detecting the one or more image capturing devices 104 are not enrolled in the system 100, may be configured to generate a request to enroll the one or more image capturing devices 104.

At operation 710, the at least one processor 200 may be configured to enroll the one or more image capturing devices 104 in the system 100. In some embodiments, enrolling the one or more image capturing devices 104 may correspond to update the system 100 with the one or more image capturing devices' 104 model and capabilities. Enrolling the one or more image capturing devices 104 may further correspond to add or register the one or more image capturing devices 104 within the system 100. At operation 712, after enrolling the one or more image capturing devices 104 the at least one processor 200 may be configured to set configuration parameters for the one or more image capturing devices 104.

In some embodiments, the configuration parameters may comprise the IP address of the one or more image capturing devices 104, and the multimedia data 600 parameters. Further, at operation 714, the at least one processor 200 may be configured to set the IP address of the one or more image capturing devices 104. At operation 716, the at least one processor 200 may be configured to set the multimedia data 600 parameters. In some embodiments, the multimedia data 600 parameters may comprise one or more resolution settings, one or more frame rate settings, and group of picture. Further, the multimedia data 600 parameters are optimized based on placement, position, and intended purpose of the one or more image capturing devices 104 within the system 100.

In some embodiments, the at least one processor 200 may be configured to convert the at least one input request using the Artificial Intelligence (AI)/Machine Learning (ML) techniques into the one or more commands. In one example embodiment, the one or more AI/ML techniques may correspond to natural language processing (NLP), clustering or unsupervised learning, reinforcement learning (RL) or any other AI/ML techniques known in the art. Further, the one or more commands may be stored in the memory 202. Thereafter, the at least one processor 200 may display the configuration data sheet to the user 302 on the user device 108 to validate and confirm the configuration and enrollment of the one or more image capturing devices 104.

FIG. 8 illustrates a flowchart 800 showing a method for configuring and enrolling the one or more image capturing devices 104 in accordance with an example embodiment of the present disclosure. FIG. 8 is described in conjunction with FIGS. 1-7.

At operation 802, the at least one processor 200 may be configured to receive at least one input request from the user 302, wherein the at least one input request corresponds to a textual input related to configuration and enrollment of the one or more image capturing devices 104. The at least one input request comprises at least one of an IP address or a range of IP addresses associated with the one or more image capturing devices 104 to be configured and enrolled. In some embodiments, the at least one processor 200 may be configured to receive the IP address or the range of the IP addresses. In some embodiments, the user 302 may comprise an end user or an administrator. The user 302 or the administrator may be responsible for installing the one or more image capturing devices 104.

For example, the at least one processor 200 may receive the at least one input request from the user 302. "Enroll cameras 10.78.50.X and configure with best suitable settings" is received by the at least one processor 200 as the at least one input request.

Further, the at least one processor 200 may convert the at least one input request into one or more commands using an AI/ML technique. Further, the at least one processor 200 may tokenize the one or more commands. The at least one processor 200 may tokenize the one or more commands using the AI module 204. The at least one processor 200 may further process the tokenized one or more commands to configure and enroll the one or more image capturing devices 104. For example, the tokenized one or more commands may comprise "Enroll", "Camera", "10.75.50.X", "Configure", and "Best suitable settings". Further, the at least one processor 200 may tokenize the one or more commands into the word tokenization 502, the character tokenization 504, and the sub-word tokenization 506. Further, the at least one processor 200 using the AI module may separate the at least one input request based at least on nature breaks. Further, the at least one processor 200 breaks the at least one input request into individual characters and further divides the words using linguistic rules.

At operation 804, the at least one processor 200 may be configured to determine a position and a placement of the one or more image capturing devices 104 based at least on multimedia data 600 captured by the one or more image capturing devices 104 and the at least one input request. In some embodiments, the position and the placement of the one or more image capturing devices 104 may be determined using the video cognitive module 206. The video cognitive module 206 may correspond to a video cognitive server. For example, the video cognitive module 206 may operate the one or more image capturing devices 104 to capture the at least one multimedia data 600. The video cognitive module 206 determines the one or more image capturing devices are installed within a shopping mall.

At operation 806, the at least one processor 200 may be configured to generate a configuration data sheet for the one or more image capturing devices 104 based at least on one or more datasets and the position and the placement of the one or more image capturing devices 104. The position and placement of the one or more image capturing devices 104 may correspond to the parking lot, the lift lobby area, the reception, and the workplace. The configuration data sheet for the one or more image capturing devices 104 may be generated using the AI module 204. The configuration data sheet for the one or more image capturing devices 104 may comprise configuration settings of the one or more image capturing devices 104. Further, the configuration settings may comprise at least one of one or more resolution settings, one or more framerate settings, and group of picture (GOP) settings. Further, the one or more datasets may comprise at least one of a product user guide, product database schemas, product database configuration scripts, or camera configuration templates.

For example, the at least one processor 200 generates the configuration data sheet for the one or more image capturing devices 104. The data sheet includes the ideal configuration settings of the one or more image capturing devices 104 used in the shopping mall.

At operation 808, the at least one processor 200 may be configured to initiate the configuration and enrollment of the one or more image capturing devices 104 based at least on the generated configuration data sheet using the camera module 208. Further, the at least one processor 200 may display the configuration data sheet to the user 302 on the user device 108 for validation and confirmation on the configuration and enrollment of the one or more image capturing devices 104.

For example, upon completing the configuration process, the at least one processor 200 presents the configuration data sheet to the security administrator through the user device 108 interface. The administrator reviews the configuration settings and confirms the configuration settings. The administrator further ensures that the one or more image capturing devices 104 are correctly configured and enrolled according to the user's 302 security requirements.

In some embodiments, a non-transitory machine-readable information storage medium is disclosed. The non-transitory machine-readable information storage medium may comprise one or more instructions which when executed by at least one processor 200 for receiving at least one input request. The at least one input request corresponds to a textual input related to configuration and enrollment of the one or more image capturing devices 104. The at least one input request comprises at least one of the IP address or a range of IP addresses associated with the one or more image capturing devices 104 to be configured and enrolled. Further, the non-transitory machine-readable information storage medium may comprise one or more instructions which when executed by the at least one processor 200 for determining a position and placement of the one or more image capturing devices 104 based at least on multimedia data captured by the one or more image capturing devices 104 and the at least one input request, using the video cognitive module 206.

Further, the non-transitory machine-readable information storage medium may comprise one or more instructions which when executed by the at least one processor 200 for generating a configuration data sheet for the one or more image capturing devices 104 based at least on one or more datasets and the positions and the placement of the one or more image capturing devices 104, using the AI module 204. Thereafter, the non-transitory machine-readable information storage medium may comprise one or more instructions which when executed by the at least one processor 200 for initiating the configuration and the enrollment of the one or more image capturing devices based at least on the generated configuration data sheet using the camera module 208.

The present disclosure streamlines the enrollment and configuration of the one or more image capturing devices 104, allowing the user 302 to automatically enroll and configure the one or more image capturing devices 104. In some embodiments, the automatic configuration and enrollment of the one or more image capturing devices 104 may reduce manual intervention. In some embodiments, the present disclosure ensures that each of the one or more image capturing devices 104 may be optimized for the intended purpose and environment. Further, the present disclosure focuses on leveraging advanced image analysis techniques and AI/ML techniques to adapt dynamically to changing conditions and requirements, ensuring continuous coverage and optimal performance across all the placement and locations of the one or more image capturing devices 104 within the building.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving, via at least one processor, at least one input request from a user, wherein the at least one input request corresponds to a textual input related to configuration and enrollment of one or more image capturing devices, and the at least one input request comprises at least one of an internet protocol (IP) address or a range of IP addresses associated with the one or more image capturing devices to be configured and enrolled;

determining, via the at least one processor, a position and a placement of the one or more image capturing devices based at least on multimedia data captured by the one or more image capturing devices and at least one input request, using a video cognitive module;

generating, via the at least one processor, a configuration data sheet for the one or more image capturing devices based at least on one or more datasets and the position and the placement of the one or more image capturing devices, using an artificial intelligence (AI) module; and initiating, via the at least one processor, the configuration and the enrollment of the one or more image capturing devices based at least on the generated configuration data sheet using a camera module.

2. The method of claim 1 further comprising converting, via the at least one processor, the at least one input request into one or more commands using an artificial intelligence (AI)/machine learning (ML) technique.

3. The method of claim 2 further comprising tokenizing, via the at least one processor, the one or more commands using the AI module into a word tokenization, a character tokenization, and a sub-word tokenization.

4. The method of claim 1, wherein the multimedia data comprises at least one of one or more snapshots and video footages captured by the one or more image capturing devices.

5. The method of claim 1, wherein the position and the placement of the one or more image capturing devices corresponds to a parking lot, a lift lobby area, a reception, and a workplace.

6. The method of claim 1, wherein the configuration data sheet for the one or more image capturing devices comprises configuration settings of the one or more image capturing devices.

7. The method of claim 6, wherein the configuration settings comprise at least one of one or more resolution settings, one or more framerate settings, and group of picture (GOP) settings.

8. The method of claim 1, wherein the one or more datasets comprises at least one of a product user guide, product database schemas, product database configuration scripts, or camera configuration templates.

9. The method of claim 1 further comprising displaying, via the at least one processor, the configuration data sheet to the user on a user device for validation and confirmation on the configuration and enrollment of the one or more image capturing devices.

10. A system comprising:

a memory; and at least one processor communicatively coupled to the memory, wherein the at least one processor is configured to:

receive at least one input request from a user, wherein the at least one input request corresponds to a textual input related to configuration and enrollment of the one or more image capturing devices, and the at least one input request comprises at least one of an internet protocol (IP) address or a range of IP addresses associated with the one or more image capturing devices to be configured and enrolled;

determine a position and a placement of the one or more image capturing devices based at least on multimedia data captured by the one or more image capturing devices and at least one input request, using a video cognitive module;

generate a configuration data sheet for the one or more image capturing devices based at least on one or more datasets and the position and the placement of the one or more image capturing devices, using an artificial intelligence (AI) module; and initiate the configuration and the enrollment of the one or more image capturing devices based at least on the generated configuration data sheet using a camera module.

11. The system of claim 10, wherein the at least one processor is configured to convert the at least one input request into one or more commands using an artificial intelligence (AI)/machine learning (ML) technique.

12. The system of claim 11, wherein the at least one processor is further configured to tokenize the one or more commands using the AI module into a word tokenization, a character tokenization, and a sub-word tokenization.

13. The system of claim 10, wherein the multimedia data comprises at least one of one or more snapshots and video footages captured by the one or more image capturing devices.

14. The system of claim 10, wherein the position and the placement of the one or more image capturing devices corresponds to a parking lot, a lift lobby area, a reception, and a workplace.

15. The system of claim 10, wherein the configuration data sheet for the one or more image capturing devices comprises configuration settings of the one or more image capturing devices.

16. The system of claim 15, wherein the configuration settings comprises at least one of one or more resolution settings, one or more framerate settings, and group of picture (GOP) settings.

17. The system of claim 10, wherein the one or more datasets comprises at least one of a product user guide, product database schemas, product database configuration scripts, or camera configuration templates.

18. The system of claim 10, wherein the at least one processor is configured to display the configuration data sheet to the user on a user device for validation and confirmation on the configuration and enrollment of the one or more image capturing devices.

19. A non-transitory machine-readable information storage medium comprising one or more instructions which when executed by at least one processor causes configuring and enrolling of one or more image capturing devices by:

receiving at least one input request from a user, wherein the at least one input request corresponds to a textual input related to configuration and enrollment of the one or more image capturing devices, and the at least one input request comprises at least one of an internet protocol (IP) address or a range of IP addresses associated with the one or more image capturing devices to be configured and enrolled;

determining a position and a placement of the one or more image capturing devices based at least on multimedia data captured by the one or more image capturing devices and at least one input request, using a video cognitive module;

generating a configuration data sheet for the one or more image capturing devices based at least on one or more datasets and the position and the placement of the one or more image capturing devices, using an artificial intelligence (AI) module; and initiating the configuration and the enrollment of the one or more image capturing devices based at least on the generated configuration data sheet using a camera module.

20. The non-transitory machine-readable information storage medium of claim 19, wherein the at least one processor is configured to convert the at least one input request into one or more commands using an artificial intelligence (AI)/machine learning (ML) technique.

\* \* \* \* \*